(12) United States Patent
Dai

(10) Patent No.: US 8,787,290 B2
(45) Date of Patent: Jul. 22, 2014

(54) METHOD FOR WIRELESS RESOURCE SCHEDULING, NETWORK ELEMENT OF ACCESS NETWORK AND TERMINAL THEREOF

(75) Inventor: Qian Dai, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 98 days.

(21) Appl. No.: 13/520,006

(22) PCT Filed: May 23, 2011

(86) PCT No.: PCT/CN2011/074488

§ 371 (c)(1),
(2), (4) Date: Jun. 29, 2012

(87) PCT Pub. No.: WO2011/160522

PCT Pub. Date: Dec. 29, 2011

(65) Prior Publication Data

US 2012/0275438 A1 Nov. 1, 2012

(30) Foreign Application Priority Data

Jun. 21, 2010 (CN) .......................... 2010 1 0217609

(51) Int. Cl.
*H04W 4/00* (2009.01)
*H04W 72/12* (2009.01)

(52) U.S. Cl.
CPC ................................ *H04W 72/1284* (2013.01)
USPC .......................................... 370/329; 370/338

(58) Field of Classification Search
CPC ............ H04W 72/04; H04W 72/0413; H04W 72/048; H04W 72/087; H04W 72/1236; H04W 72/1252; H04W 72/1263; H04W 72/1268; H04W 72/1284; H04W 72/1289

USPC .......................................... 370/252, 329–342
See application file for complete search history.

(56) References Cited

U.S. PATENT DOCUMENTS

2005/0259662 A1* 11/2005 Kim et al. .................. 370/395.4
2006/0268798 A1* 11/2006 Kim et al. ..................... 370/338

(Continued)

FOREIGN PATENT DOCUMENTS

CN 101541083 A 9/2009
CN 101741713 A 6/2010

OTHER PUBLICATIONS

International Search Report for PCT/CN2011/074488 dated Aug. 10, 2011.

*Primary Examiner* — Kan Yuen
(74) *Attorney, Agent, or Firm* — Ling Wu; Stephen Yang; Ling and Yang Intellectual Property

(57) ABSTRACT

Disclosed in the present invention is a radio resource scheduling method, including: a network element in an access network acquiring uplink (UL) data feature information corresponding to a service supported by a terminal; the terminal waiting for an UL resource scheduling signaling of the network element in the access network when judging that an initiated service is regular or predictable; the network element in the access network sending the UL resource scheduling signaling to the terminal to carry out UL resource scheduling on the terminal according to the UL data feature information corresponding to the service initiated by the terminal when the service initiated by the terminal is regular or predictable. Also disclosed in the present invention are a network element in an access network element and a terminal. The present invention enables the UL resource scheduling to save more control signaling, improving the radio spectrum efficiency and system throughput.

17 Claims, 6 Drawing Sheets

(56) References Cited

U.S. PATENT DOCUMENTS

| | | |
|---|---|---|
| 2007/0140165 A1 | 6/2007 | Kim et al. |
| 2011/0063977 A1* | 3/2011 | Halfmann et al. ............ 370/235 |
| 2012/0099503 A1* | 4/2012 | Guo et al. .................... 370/312 |
| 2013/0279450 A1* | 10/2013 | Anderson et al. ............ 370/329 |

* cited by examiner

METHOD FOR WIRELESS RESOURCE SCHEDULING, NETWORK ELEMENT OF ACCESS NETWORK AND TERMINAL THEREOF

TECHNICAL FIELD

The present invention relates to the technical field of wireless communication, and particularly to a radio resource scheduling method, a network element of an access network and a terminal in a wideband wireless communication system.

BACKGROUND OF THE RELATED ART

The uplink radio resource scheduling in the existing wideband wireless communication system generally follows the following method:

(1) first, the terminal sends a scheduling request or a bandwidth request to the base station according to its own service data amount;

(2) the base station decides whether to allocate uplink radio resources to the terminal or not according to the application of the terminal in conjunction with the channel situation and the service load situation;

(3) if the base station decides to allocate radio resources to the terminal, then it sends an uplink resource allocation signaling to the terminal so as to notify the terminal to use which uplink resource to send data.

The above method can well support the existing services of the mobile terminal, such as Voice over Internet Protocol (VoIP) service, web game service, wireless video service, File Transfer Protocol (FTP) service, etc.

The above services are mainly applied in Human to Human (H2H) communication, and with the development of Internet of Things, Machine to Machine (M2M) communication (referred to as Machine Type Communication (MTC) in 3rd Generation Partnership Project (3GPP)) will gradually be introduced into the whole society. The narrow definition of M2M is machine to machine communication, and the broad definition thereof is a networked application and service with the core thereof being the intelligent interaction of the machine terminal. It is an informationization solution provided for the clients with a plurality of communication methods as the access means based on intelligent machine terminals, and is for satisfying the informationization requirements of the clients on aspects such as monitoring, command and scheduling, data collection and measurement, etc.

In the application of M2M, there are very broad service types, such as home metering, industrial production meter automation, water quality monitoring, intelligent traffic, asset tracking, etc., and in these service types, the size of the uplink (UL) data transmission of some services is one or more fixed, for example, some instrument meters in the industry production, portable health monitor, and equipment in the asset tracking field, and the size of the uplink data transmission of some services fluctuates but not fixed, such as consumption electronic device, intelligent traffic system, etc. However, as to the network side, its scheduling flow does not differentiate whether the uplink data size of the service is fixed or not, and in the existing Long Term Evolution (LTE) technology, when a terminal in the connected state has UL data to be transmitted, the following steps have to be performed (referring to FIG. 1):

when the terminal has UL data to be transmitted (step S110), the terminal sends a scheduling request (SR) to the network element in the access network (in the LTE, the network element in the access network is an eNodeB (eNB)) (step S120); the network element in the access network carries out first UL resource scheduling on the terminal (step S130), and the first allocated UL resource is usually small so as to avoid waste caused by too many allocated resources; the terminal sends a buffer status report (BSR) on the UL resource allocated by the network element in the access network to the network element in the access network to report the data amount size to be uploaded (step S140), and the network element in the access network carries out subsequent UL resource scheduling on the terminal according to the BSR (step S150).

The application inventors of the present invention have found:

as to such M2M service with unfixed UL data amount transmitted each time, it is necessary for the terminal to send an SR and a BSR to the eNB since the UL data amount is unpredictable;

however, as to such M2M service with fixed or regular UL data amount transmitted each time, it is redundant for the terminal to send an SR and a BSR to the eNB since the UL data amount is predictable. In addition, during the first UL resource scheduling after the network element in the access network receives the SR, since the UL data amount to be transmitted is unknown, the network element in the access network usually will allocate fewer UL resource to the terminal so as to avoid waste, which further causes delay to the packet transmission of the terminal and reduction to the data throughput of the terminal. Especially when M2M is widely applied and M2M equipment is widely used, such redundancy will form considerable addition signaling overhead, influence the system throughput, as well as bring additional UL scheduling delay; and the packet transmission delay of the terminal will also reduce the satisfaction of feeling from the terminal.

SUMMARY OF THE INVENTION

The technical problem to be solved by the present invention is to provide a radio resource scheduling technology, so as to overcome the technical defects that the existing UL radio resource scheduling technology is not suitable for services with regular or predictable UL data amount to be transmitted.

In order to solve the above technical problem, the present invention provides a radio resource scheduling method, and the method includes:

a network element in an access network acquiring uplink (UL) data feature information corresponding to a service supported by a terminal;

the terminal waiting for an UL resource scheduling signaling of the network element in the access network when judging that an initiated service is regular or predictable; and the network element in the access network sending the UL resource scheduling signaling to the terminal so as to carry out UL resource scheduling on the terminal according to the UL data feature information corresponding to the service initiated by the terminal when the service initiated by the terminal is regular or predictable.

In the above method, the UL data feature information corresponding to the service supported by the terminal comprises a data model feature of the service supported by the terminal or packet size information about the service supported by the terminal.

In the above method, the data model feature comprises one or more of the following pieces of information:

whether packet size range is fixed, quantity of kinds of packets with fixed packet size range, whether a packet is sent for a single time, whether the packet is sent periodically, a period for sending a kind of packet which is sent periodically, whether a sending order of many kinds of packets with fixed size range is consistent with a fixation rule and the fixation rule with which this sending order is consistent.

In the above method, the packet size information about the service supported by the terminal comprises one or more of the following pieces of information:

an actual value or actual value range of the packet size, a level of the packet size range and a packet size type divided according to the packet size range.

In the above method, the step of the network element in the access network acquiring uplink (UL) data feature information corresponding to the service supported by the terminal comprises:

the network element in the access network acquiring the UL data feature information corresponding to the service supported by the terminal from a network element in a core network, a machine type communication (MTC) server or the terminal.

In the above method, when the network element in the access network acquires the UL data feature information corresponding to the service supported by the terminal from the network element in the core network, the UL data feature information corresponding to the service supported by the terminal is stored in the network element in the core network, and register information corresponding to the terminal comprises the UL data feature information corresponding to the service supported by the terminal;

when the network element in the access network acquires the UL data feature information corresponding to the service supported by the terminal from the MTC server, the MTC service stores the UL data feature information corresponding to the service supported by the terminal.

In the above method, the UL data feature information corresponding to the service supported by the terminal is transmitted to the network element in the access network via an S1 interface signaling flow by the network element in the core network or forwarded to the network element in the access network via the network element in the core network by the MTC server.

In the above method, the S1 interface signaling flow comprises an S1 interface signaling in a terminal context initialization flow, an S1 interface signaling in a terminal context change flow, or a newly added S1 interface signaling.

In the above method, the step of the network element in the access network acquiring the UL data feature information corresponding to the service supported by the terminal from the terminal comprises: the terminal reporting the UL data feature information during a process when the terminal establishes a connection with network side.

In the above method, the process of the terminal establishing a connection with the network side comprises:

a random access process of the terminal, a radio resource control (RRC) layer connection establishment process with the network element in the access network, a RRC layer connection reconfiguration process with the network element in the access network or a RRC layer connection reestablishment process with the network element in the access network.

In the above method, the step of the terminal reporting the UL data feature information during the process when establishing a connection with the network side comprises:

the terminal reporting the UL data feature information corresponding to the service supported by the terminal in a message 3 during the random access process, or the terminal reporting the UL data feature information corresponding to the service supported by the terminal in a connection request message or a connection establishment completed message during the RRC layer connection establishment process, or the terminal reporting the UL data feature information corresponding to the service supported by the terminal in a connection reconfiguration completed message during the RRC layer connection reconfiguration process, or the terminal reporting the UL data feature information corresponding to the service supported by the terminal in a connection reestablishment request message or a connection reestablishment completed message during the RRC layer connection reestablishment process.

The method further comprises:

the terminal sending a scheduling request to the network element in the access network, and the network element in the access network sending the UL resource scheduling signaling to the terminal according to the UL data feature information corresponding to the service initiated by the terminal after receiving the scheduling request.

The method further comprises:

the network element in the access network failing to receive the data reported by the terminal at a UL scheduling position, then the network element in the access network stopping scheduling and waiting for the terminal to report a scheduling request and a UL data amount size information report.

In order to solve the above technical problem, the present invention also provides a network element in an access network, comprising an acquisition module and a sending module, wherein the acquisition module is configured to acquire uplink (UL) data feature information corresponding to a service supported by a terminal;

the sending module is configured to send the UL resource scheduling signaling to the terminal so as to carry out UL resource scheduling on the terminal according to the UL data feature information corresponding to the service initiated by the terminal when the service initiated by the terminal is regular or predictable.

In the above network element in the access network, the acquisition module is configured to acquire the UL data feature information corresponding to the service supported by the terminal by the following way: acquire the UL data feature information corresponding to the service supported by the terminal from the network element in the core network, a machine type communication (MTC) server or the terminal.

In the above network element in the access network, the acquisition module is configured to acquire the UL data feature information corresponding to the service supported by the terminal by the following way: acquire the UL data feature information corresponding to the service supported by the terminal during a random access process of the terminal, a RRC layer connection establishment process of the network element in the access network and the terminal, a RRC layer connection reconfiguration process of the network element in the access network or a RRC layer connection reestablishment process of the network element in the access network.

In order to solve the above technical problem, the present invention also provides a terminal, comprising a sending module, a service initiation module, and a receiving module, wherein the sending module is configured to send uplink (UL) data feature information corresponding to a service supported by the terminal to a network element in an access network;

the service initiation module is configured to initiate a service, and the receiving module is configured to receive an UL resource scheduling signaling sent from the network element in the access network;

wherein the network element in the access network is used for sending the UL resource scheduling signaling according to the UL data feature information corresponding to the service initiated by the service initiation module.

In the above terminal, the sending module is configured to send the UL data feature information corresponding to the service supported by the terminal to the network element in the access network: send the UL data feature information corresponding to the service supported by the terminal to the network element in the access network during a random access process of the terminal, an RRC layer connection establishment process with the network element in the access network, an RRC layer connection reconfiguration process with the network element in the access network or an RRC layer connection reestablishment process with the network element in the access network.

As compared to the related art, in the resource scheduling technology proposed in the technical solution of the present invention, as to services with the UL data amount thereof being regular or predictable, by way of changing the existing scheduling flow, the UL resource scheduling can save more control signaling and reduce scheduling delay, improving the radio spectrum efficiency and system throughput and enhancing user experience.

BRIEF DESCRIPTION OF DRAWINGS

The drawings are used to provide a further understanding for the present invention, and constitute a part of the specification. The drawings are used to illustrate the present invention along with embodiments of the present invention and not intended to limit the present invention. In the drawings.

PREFERRED EMBODIMENTS OF THE PRESENT INVENTION

In order to make the objects, technical solution and advantages of the present invention clearer, the embodiments of the present invention will be described in detail in conjunction with the accompanying drawings hereinafter, the implementation process of how the present invention employs technical means to solve technical problems and achieve technical effects can be fully understood and implemented by means of this.

It needs to note that if there is no conflict, the embodiments of the present invention and the features in the embodiments can be combined with each other, which is within the scope of protection of the present invention. Furthermore, the steps shown in the flowcharts of the accompanying drawings can be performed in a computer system such as a set of computer executable instructions, and although the logical order is shown in the flowcharts, the steps shown or described can be performed in an order different from the order here in some cases.

Embodiment I

Radio Resource Scheduling Method

Figure 1:
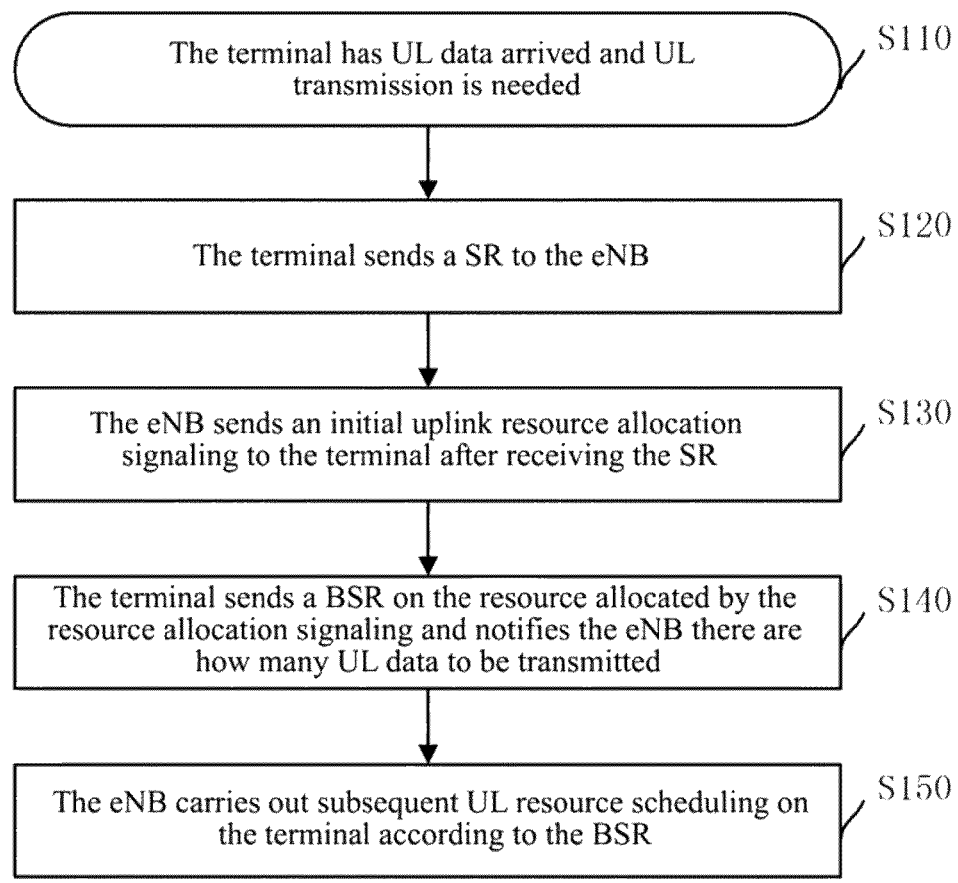
FIG. 1 is a flowchart of an eNodeB carrying out UL resource scheduling on a terminal in the existing LTE technology.
Figure 2:
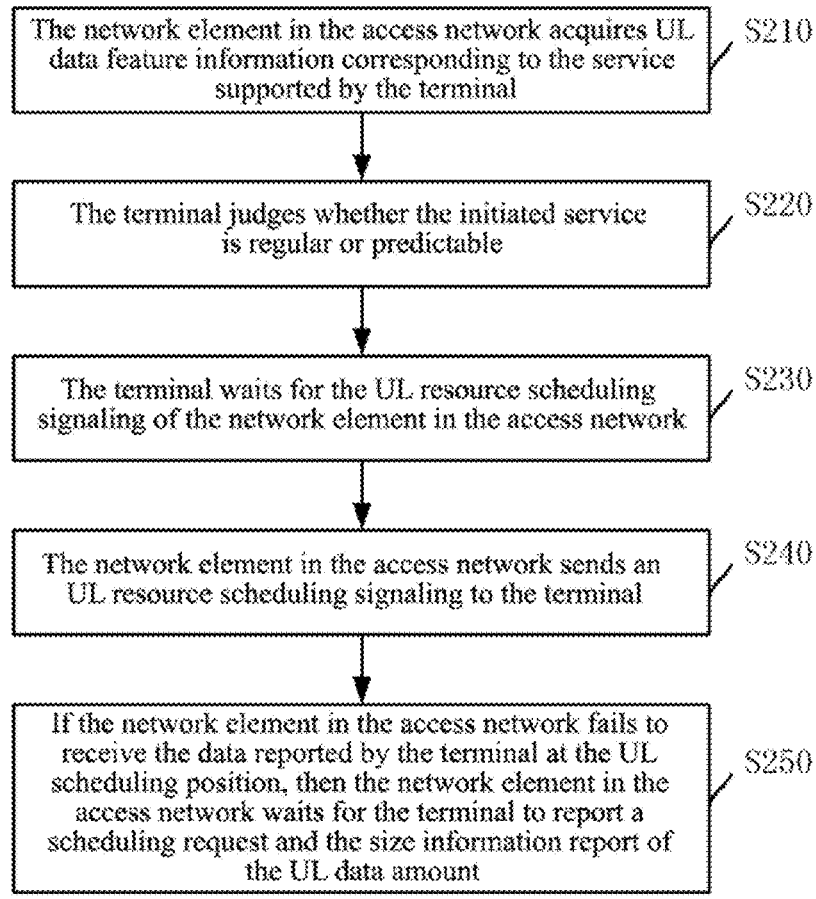
FIG. 2 is a flowchart of a radio resource scheduling method provided by the embodiments of the present invention.

As shown in FIG. 2, the present embodiment mainly includes the following steps:

in step S210, an network element in the access network acquires UL data feature information corresponding to a service supported by a terminal;

in step S220, the terminal judges whether the initiated service is regular or predictable, also referred to as "the data feature is predictable" hereinafter, according to the UL data feature information, after completing the random access to the network element in the access network, the radio resource control (RRC) connection establishment, authentication, and the establishment of signaling bearer and data bearer;

in step S230, if the terminal judges that the service initiated is regular or predictable, then there is no need to send a size information report of the UL data amount to be transmitted (also referred to as cache area state report) to the network element in the access network, but to wait for the UL resource scheduling signaling of the network element in the access network;

in step S240, the network element in the access network need not wait for the size information about the UL data amount to be transmitted sent by the terminal but sends an UL resource scheduling signaling to the terminal according to the UL data feature information corresponding to the service initiated by the terminal obtained in advance so as to carry out UL resource scheduling on the terminal;

in step S250, if the network element in the access network fails to receive the data reported by the terminal at the UL scheduling position, then the network element in the access network stops active scheduling but waits for the terminal to report a scheduling request and the UL data amount size information report according to the flow of the related art.

The above UL data feature information includes but not limited to:

(I) the data model feature of the corresponding service, which includes one or more of the following:

(1) whether the packet size range is fixed, where the range being fixed refers to the fluctuation (or variance) of the packet size is less than a certain predetermined threshold;

(2) the quantity of kinds of packets with fixed packet size range, the kinds of the packets are divided according to the packet size range, the packets with the same range is divided into a class, and the size ranges of different kinds of packets are different;

(3) whether the packet is sent for a single time, and being sent for a single time refers to that the current UL transmission can be completed by only sending a packet;

(4) whether the packet sending is periodical;

(5) if the sending of a certain kind of packets is periodical, then the sending period of such kind of packets is how long;

(6) if there are many kinds of packets with fixed size range, whether the sending order among various kinds of packets is complied with a certain fixed rule, if yes, then such a fixed rule is which rule; and (7) other features;

(II) the packet size information of the corresponding service, and this item of information may not be included for those service types with unfixed packet size range.

The packet size information of the corresponding service can be implemented by way of one of the following methods:

(1) the actual value or actual value range of the packet size;

(2) the level of the packet size range, the packet size is represented by level, and each level corresponds to a packet size range; and (3) the packet size types divided according to the packet size range, for example, this service is indicated as "short data" (the data length is relatively short), "non-short data", etc., each type corresponds to different packet size range.

In the above step S210, the method for the network element in the access network to obtain the UL data feature information includes but not limited to:

situation (A): the network element in the access network acquires UL data feature information corresponding to a service supported by a terminal form a network element in a core network; or situation (B), the network element in the access network acquires UL data feature information corresponding to a service supported by a terminal from the terminal.

In the above step S210, the implementation for the network element in the access network to acquire the UL data feature information form the network element in the core network described in situation (A) includes but not limited to:

in step (A1), the UL data feature information corresponding to the service supported by the terminal is stored in the network element of the core network or a machine type communication (MTC) server, and in step (A2), the UL data feature information corresponding to the service supported by the terminal is sent to the network element in the access network so as to assist UL scheduling on the terminal.

The UL data feature information being stored in the network element in the core network or MTC server described in step (A1) includes but not limited to:

situation (A1a): the UL data feature information corresponding to the service supported by the terminal is included in the register information corresponding to the terminal, or situation (A1b): the UL data feature information corresponding to the service supported by the terminal is stored in the memory of the MTC server.

The UL data feature information being sent to the network element in the access network described in step (A2) includes but not limited to:

situation (A2a): the network element in the core network transmits the UL data feature information to the eNode B by way of an S1 interface signaling flow, or situation (A2b): the MTC server sends the UL data feature information to the network element in the access network via the network element in the core network.

The method for the network element in the core network to transmit the UL data feature information to the eNode B by way of an S1 interface signaling flow described in situation (A2a) includes but not limited to:

the core network element inserts the UL data feature information into an existing S1 interface signaling, such as the S1 interface signaling in the terminal context initialization flow, or the S1 interface signaling in the terminal context change flow, or a newly added S1 interface signaling.

The implementation for the network element in the access network to obtain the UL data feature information from the terminal described in situation (B) includes but not limited to:

situation (B1): the terminal reports the UL data feature information during the connection establishment process with the network side, and the implementation includes but not limited to:

situation (B1a): the terminal reports the UL data feature information during the random access process, for example, the UL data feature information is reported in a message 3 (msg3) during the random access process of the terminal;

situation (B1b): the terminal reports the UL data feature information during the RRC connection establishment process, for example, the terminal reports the UL data feature information in an RRC connection request message, or the terminal reports the UL data feature information in an RRC connection establishment completed message;

situation (B1c): the terminal reports the UL data feature information during an RRC connection reconfiguration process, for example, the UL data feature information is reported in an RRC connection reconfiguration completed message; and situation (B1d): the terminal reports the UL data feature information during the RRC connection reestablishment process, for example, the terminal reports the UL data feature information in an RRC connection reestablishment request message, or the terminal reports the UL data feature information in an RRC connection reestablishment completed message.

In the above step S220, "the data feature is predictable" refers to that the packet size range is fixed and the sending thereof has a certain rule, the eNB can learn the size range and sending time of the next packet to be sent by the terminal according to the feature information in advance, for example, a packet service with fixed size range is sent only for a single time, a packet service with fixed size range is sent periodically, etc. As a contrast, "the data feature is unpredictable" refers to that the packet size range is unfixed, or there are many kinds of packets with fixed size range but the sending order thereof has no fixed rule, etc.

In the above step S230, the terminal can send a scheduling request to the network element in the access network and waits for the UL resource scheduling signaling sent by the network element in the access network; in step S240, the network element in the access network has to wait for the scheduling request reported by the terminal, and sends an UL resource scheduling signaling to the terminal according to the UL data feature information corresponding to the service initiated by the terminal obtained in advance after receiving the scheduling request so as to carry out UL resource scheduling on the terminal.

In the above step S230, the terminal may also not report the scheduling request but directly wait for the UL resource scheduling signaling sent by the network element in the access network; in step S240, the network element in the access network also need not wait for the scheduling request and the size information about the UL data amount to be transmitted sent by the terminal but directly sends an UL resource scheduling signaling to the terminal according to the UL data feature information corresponding to the service initiated by the terminal obtained in advance so as to carry out UL resource scheduling on the terminal.

An application example of the present embodiment is an application in the LTE system, the network element in the core network is a mobility management entity (MME), the network element in the access network is eNodeB (abbreviated as eNB), and the register information about the terminal is stored in a home subscriber server (HSS).

The eNB has to first obtain the UL data feature information about the terminal if it wants to carry out the radio resource scheduling in the present invention. As mentioned above, the acquisition method includes:

the network element in the access network acquires the UL data feature information corresponding to the service supported by the terminal from the network element in the core network, or the network element in the access network acquires the UL data feature information corresponding to the service supported by the terminal from the terminal.

The method for the network element in the access network acquires the UL data feature information from the network element in the core network includes: the UL data feature information corresponding to the service supported by the terminal is included in the corresponding register information about the terminal (such as stored in the HSS), or the UL data feature information corresponding to the service supported by the terminal is included in the MTC server.

Figure 3:
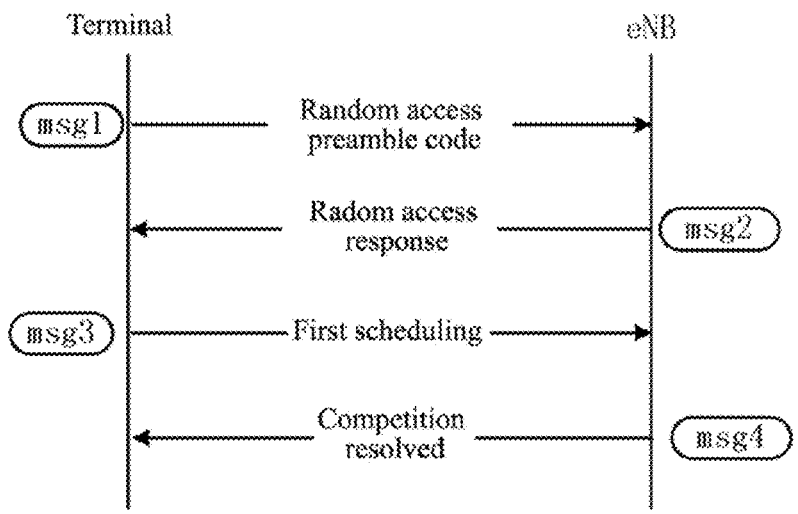
FIG. 3 is a flowchart of the random access of the terminal in the present invention.
Figure 5:
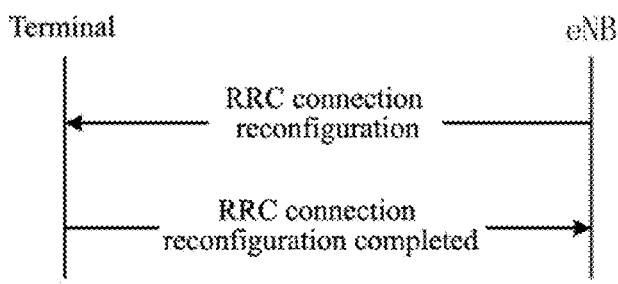
FIG. 5 is a flowchart of the RRC connection reconfiguration of the terminal in the present invention.
Figure 6:
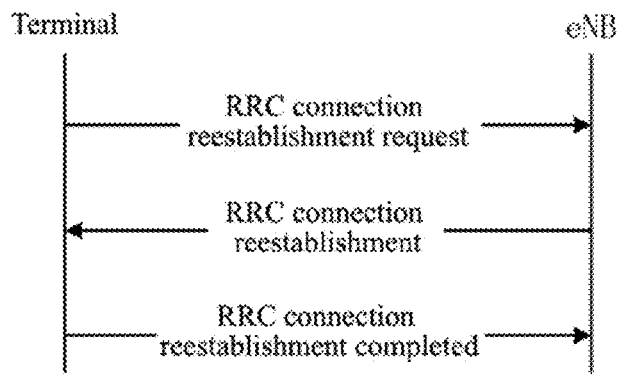
FIG. 6 is a flowchart of the RRC connection reestablishment of the terminal in the present invention.

The method for sending the UL data feature information about the terminal to the network element in the access network includes:

(1) if the network element in the access network wants to acquire the UL data feature information from the network element in the core network, then there are the following methods:

the network element in the core network transmits the UL data feature information to the eNode B by way of an S1 interface signaling flow, for example, the UL data feature information is inserted into the existing terminal context initialization flow or the terminal context change flow of the S1 interface for sending, or a newly added S1 interface signaling flow dedicated for sending the UL data feature information;

(2) if the network element in the access network wants to acquire the UL data feature information from the MTC server, this also has to be done by way of the forwarding process of the above network element in the core network;

(3) if the network element in the access network wants to acquire the UL data feature information corresponding to the service supported by the terminal from the terminal, then the UL data feature information can be reported during the connection establishment process of the terminal and the network side; and the method for reporting UL data feature information during the connection establishment process of the terminal and the network side includes:

the UL data feature information is reported during the random access process by the terminal, for example, the UL data feature information is reported in the message 3 (msg3) (referring to FIG. 3, msg3 is as shown in FIG. 3, the first scheduling performed by the eNB on the UE during the random access process is used for indicating the sending resource of msg4), or the terminal reports the UL data feature information during the RRC connection establishment process, for example, the terminal reports the UL data feature information in an RRC connection request message, or the terminal reports the UL data feature information in an RRC connection establishment completed message (referring to FIG. 4); or the terminal reports the UL data feature information during the RRC connection reconfiguration process, for example, the UL data feature information is reported in the RRC connection reconfiguration message (referring to FIG. 5), or the terminal reports the UL data feature information during the RRC connection reestablishment process, for example, the UL data feature information is reported in an RRC connection reestablishment request message, or the UL data feature information is reported in an RRC connection reestablishment completed message (referring to FIG. 6).

Figure 4:
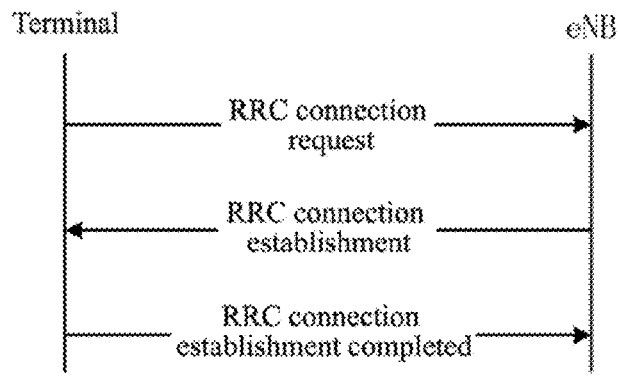
FIG. 4 is a flowchart of the RRC connection establishment of the terminal in the present invention.

The random access flow of the terminal shown in FIG. 3, the RRC connection establishment flow of the terminal shown in FIG. 4, the RRC connection reconfiguration flow of the terminal shown in FIG. 5, and the RRC connection reestablishment flow of the terminal shown in FIG. 6 can be understood in conjunction with the related art, which need not be described here.

The above UL data feature information includes:

the UL data of various services supported by the terminal has what kind of data model feature, and the packet size information about the corresponding service (this information may not be included for those service types with unfixed packet size range).

The data model feature of the UL data of various services supported by the above terminal comprises, for example, (1) whether the packet size range is fixed, where the range being fixed refers to the fluctuation (or variance) of the packet size is less than a certain predetermined threshold;

(2) the quantity of kinds of packets with fixed packet size range, the kinds of the packets are divided according to the packet size range, the packets with the same range is divided into a class, and the size ranges of different kinds of packets are different;

(3) whether the packet is sent for a single time;

(4) whether the packet sending is periodical;

(5) if the sending of a certain kind of packets is periodical, then the sending period of such kind of packets is how long;

(6) if there are many kinds of packets with fixed size range, whether the sending order among various kinds of packets is complied with a certain fixed rule, if yes, then such a fixed rule is which rule; and (7) other features.

As to those services with the data feature thereof being regular or predictable (which refers to that the packet size range is fixed and the sending has a fixed rule, the eNB can learn the size range and sending time of the next packet to be sent by the terminal according to the feature information in advance, for example, a packet service with fixed size range is sent for only a single time, a packet service with fixed size range is sent periodically, etc., as a contrast, an irregular or unpredictable service refers to that the packet size range is unfixed, or there are many kinds of packets with fixed size range but the sending order thereof has no fixed rule), the eNB can carry out UL resource scheduling according to the data feature information thereof.

The above data model feature is only for example, and there can be many other kinds and classification methods, and the classification method has no influence on the essence of the present invention.

The packet size information of the above corresponding service can be implemented by way of one of the following methods:

(1) the actual value or actual value range of the packet size, such as a particular number with byte as the unit or with bit as the unit, or (2) packet size represented with level, for example, the packet size is divided into several levels, and each level represents different packet size range, or (3) rough type differentiation is carried out according to the packet size range, for example, this service is indicated as "short data", "medium data", "large data", etc., each type corresponds to a relatively wide packet size range, for example, the "short data" represents that the packet size is not greater than 300 bytes, "medium data" represents that the packet size is between 300 bytes and 1 MByte, and "large data" represents that the packet size is larger than 1 MByte. The above is only as an example but not intended to limit the present invention.

The above methods are only part of examples for describing packet size information, and there can be other methods, as long as they can represent packet size, and there is no influence on the subsequent invention contents.

The terminal has to first complete the random access process, the process of establishing an RRC layer connection with the eNB, authentication process, the process of establishing a signaling bearer and a data bearer, and then can carry out UL data transmission. During any of these processes, the network element in the access network eNB can obtain the UL data feature information corresponding to the service initiated by this terminal according to the above method.

After the terminal and the network side have completed the above processes, both the eNB and the terminal have to judge whether the service initiated by the terminal belongs to a service with "the data feature thereof being predictable", if yes, then the following 2 UL scheduling methods can be employed:

(1) the terminal need not report a scheduling request nor a buffer status report (BSR, including the size information about the UL data amount to be transmitted by the terminal) but to wait for the UL resource scheduling signaling of the network element in the access network; the eNB need not wait for the terminal to report a scheduling request nor a BSR but directly carries out UL resource scheduling on the terminal according to the UL data feature information corresponding to the service initiated by this terminal obtained in advance; and (2) the terminal has to report a scheduling request but need not report the BSR, and after having reported the scheduling request, the terminal waits for the UL resource scheduling signaling of the network element in the access network; the eNB has to wait for the terminal to report the scheduling request and need not wait for the BSR after receiving the scheduling request and directly carries out UL resource scheduling on the terminal according to the UL data feature information corresponding to the service initiated by this terminal obtained in advance.

The network element in the access network has to wait for the scheduling request reported by the terminal and then send the UL resource scheduling signaling, and as compared to the fact that the eNB need not wait for the scheduling request reported by the terminal but directly sends a UL resource scheduling signaling, the scheduling delay is larger, and the scheduling request will bring more signaling overhead, however, these two methods have their own advantages and disadvantages.

The UL resource scheduling is for example:

if the packet to be sent by the terminal is relatively large, there are not enough resources in a subframe to carry all the data of the packet, the eNB can allocate the UL resources of several continuous subframes for the terminal;

if the service established by the terminal belongs to a single type of periodical packet service, then the eNB can configure Semi-Persistent Scheduling (i.e. a periodical UL resource with fixed frequency domain resource location is allocated to the terminal, wherein the period thereof matches the packet report period of the terminal) for the terminal.

The above scheduling examples belong to the implementation problems of the eNB and are only taken as examples for describing the assistant of the present invention on the eNB scheduling but not as a limit to the present invention.

Figure 7:
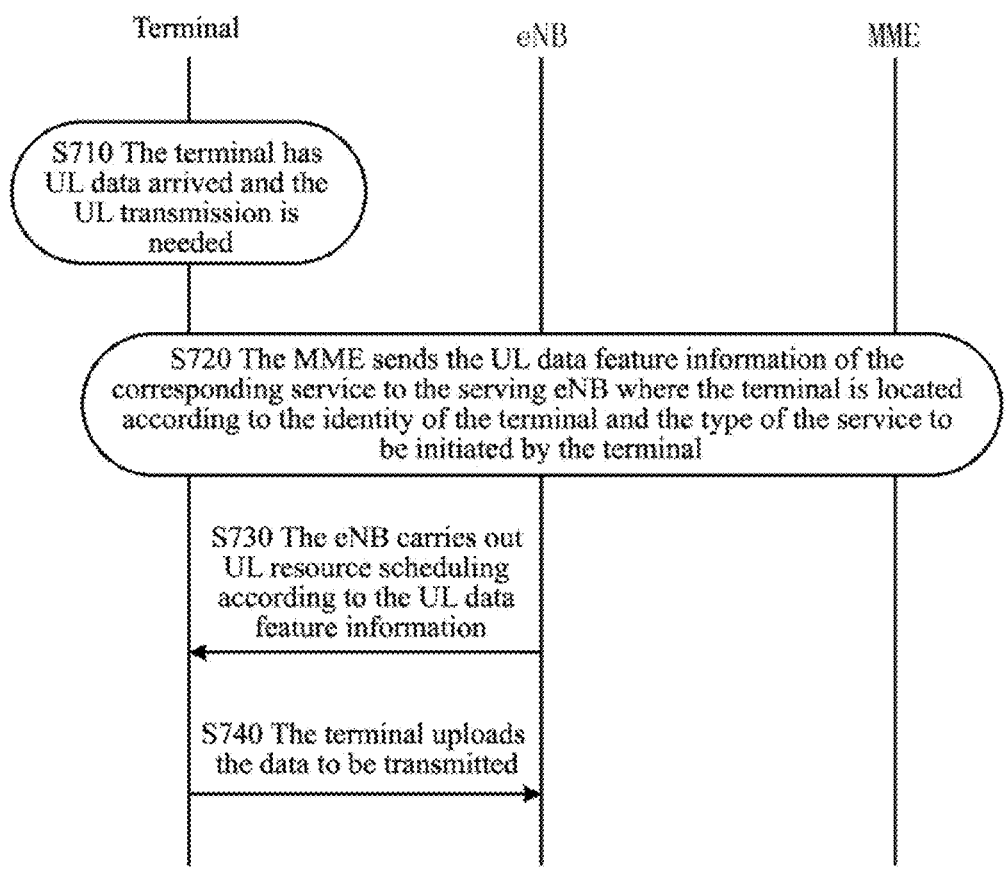
FIG. 7 is a flowchart of a Mobile original scenario in the embodiments of the present invention.

FIG. 7 is a flowchart of a radio resource scheduling example, taking "Mobile original" (calling party) as an example, and as shown in FIG. 7, it mainly includes the following steps:

in step S710, the terminal has UL data to arrive and the UL transmission is needed;

in step S720, the terminal completes random access, the establishment of an RRC layer connection with the eNodeB, the authentication process and the establishment of a signaling bearer and a data bearer, and during these processes, the MME sends the UL data feature information of the corresponding service to the serving eNodeB where the terminal is located according to the identity of the terminal and the type of the service to be initiated by the terminal;

in step S730, the eNodeB carries out UL resource scheduling according to the UL data feature information; and in step S740, the terminal uploads the data to be transmitted.

In step S730, after the terminal completes the processes such as access, authentication and so on with the network side, the eNB can actively carries out UL resource scheduling on the terminal (without needing to wait for the terminal to send the scheduling request and BSR).

Of course, according to the above examples, another implementation method is: the eNB carries out UL scheduling on the terminal after receiving the scheduling request sent by the terminal.

Since the eNB already knows the size of the data amount to be transmitted by the terminal, the first UL scheduling of the eNB can schedule the terminal according to the maximum UL resources which can be allocated, so that the throughput of the terminal can be greatly improved and the transmission delay of the terminal can be reduced.

When the present invention is implemented using the above eNB which need not wait for the terminal to report the scheduling request or BSR, there may be another situation:

after the terminal receives "Mobile Terminating" (called party) and the eNB allocates a UL resource to the terminal, if at this moment the terminal has no UL data to be transmitted, then the eNB will not receive any UL data at the predetermined UL resource location. In such a case, the eNB can stop actively allocating UL resources to the terminal but wait for the terminal to send a scheduling request according to the flow in the related art and wait for the subsequent BSR.

If the eNB has to wait for the scheduling request reported by the terminal and then send a UL resource scheduling signaling, then eNB will carry out the UL scheduling after receiving the scheduling request sent by the terminal, reducing possible redundant UL scheduling signaling.

Figure 8:
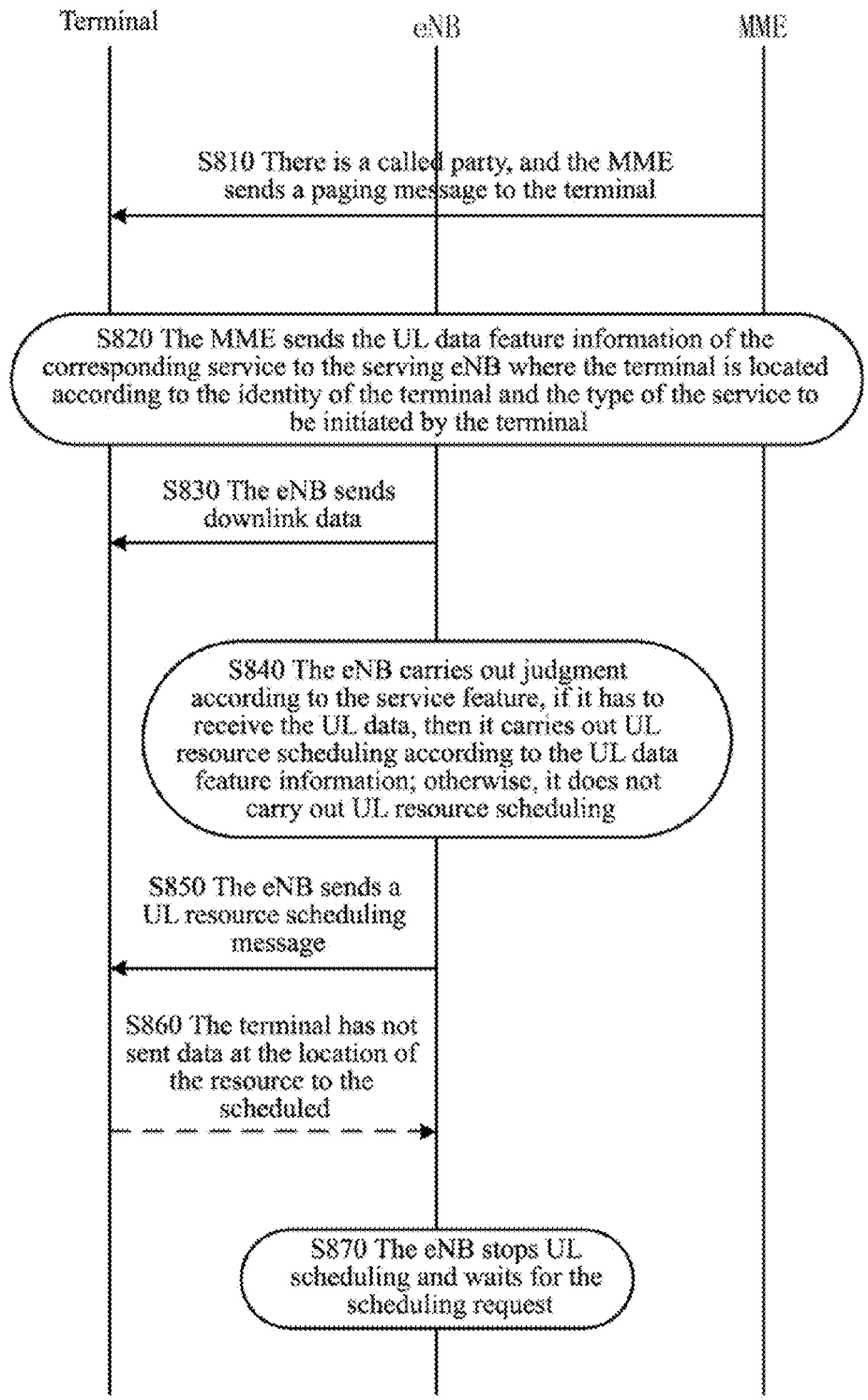
FIG. 8 is a flowchart of a Mobile Terminating scenario in the embodiments of the present invention.

FIG. 8 is exactly a flowchart of radio resource scheduling when the network element in the access network directly carries out UL resource scheduling on the terminal (i.e. the terminal need not report a scheduling request). As shown in FIG. 8, it mainly includes the following steps:

in step S810, there is a Mobile Terminating, and the MME sends a paging message to the terminal;

in step S820, the terminal completes random access, the establishment of an RRC layer connection with the eNodeB, the authentication process and the establishment of a signaling bearer and a data bearer after receiving the paging, and during any of the above processes, the MME sends the UL data feature information of the corresponding service to the serving eNodeB where the terminal is located according to the identity of the terminal and the type of the service to be initiated by the terminal;

in step S830, the eNodeB sends downlink data to the terminal;

in step S840, the eNodeB carries out judgment according to the service feature, if the eNodeB has to receive the UL data reported by the terminal, then it carries out UL resource scheduling according to the UL data feature information; and it need not receive the UL data reported by the terminal, then it does not carry out UL resource scheduling;

in step S850, the eNodeB sends a UL resource scheduling message;

in step S860, the terminal has not sent data at the scheduled location of the resource; and in step S870, the eNodeB stops UL scheduling and waits for the scheduling request.

In the above step S830, after the eNB sends downlink MT (Mobile Terminating) data, in step S840, the eNB judges whether the terminal has UL data to be transmitted within the subsequent time according to the feature information about the service initiated by this terminal, if yes, then the eNB can actively carry out UL resource scheduling on the terminal (without needing to wait for the terminal to report the scheduling request or BSR, or only wait for the scheduling request).

In this example, assuming that the eNB judges that the terminal has UL data to be transmitted within the subsequent time, then perform step S850, i.e. the eNB carries out UL scheduling on the terminal.

The dashed lines shown in step S860 indicate that the terminal has not sent UL data at the resource location indicated by the UL scheduling, and there may be many reasons causing such situation, for example, the arrival of the UL data has delay, or the terminal fails to obtain the UL data normally, etc.

In step S870, the eNB can carry out the subsequent UL scheduling according to the flow in the related art (i.e. waiting for the scheduling request and BSR).

The above examples are used for describing how the eNB carries out UL scheduling on the terminal by using the data feature information corresponding to the terminal.

Embodiment II

A Network Element in the Access Network

Figure 9:
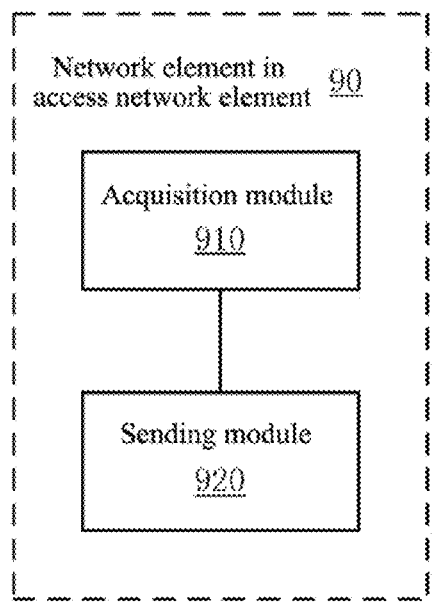
FIG. 9 is a schematic diagram of the composition of an network element in the access network in embodiment II of the present invention.

As shown in FIG. 9, the network element in the access network 90 in the present embodiment mainly includes an acquisition module 910 and a sending module 920, wherein the acquisition module 910 is configured to acquire uplink (UL) data feature information corresponding to a service supported by a terminal; and the sending module 920 is connected to this acquisition module 910 and the sending module 920 is configured to send the UL resource scheduling signaling to the terminal so as to carry out UL resource scheduling on the terminal according to the UL data feature information corresponding to the service initiated by the terminal when the service initiated by the terminal is regular or predictable.

In this embodiment, the acquisition module 910 is configured to: acquire the UL data feature information corresponding to the service supported by the terminal from the network element in the access network, a machine type communication (MTC) server or the terminal.

In this case, the acquisition module 910 is configured to: acquire the UL data feature information corresponding to the service supported by the terminal during a random access process of the terminal, an RRC layer connection establishment process of the network element in the access network with the terminal, an RRC layer connection reconfiguration process of the network element in the access network or an RRC layer connection reestablishment process of the network element in the access network.

Embodiment II

A Terminal

Figure 10:
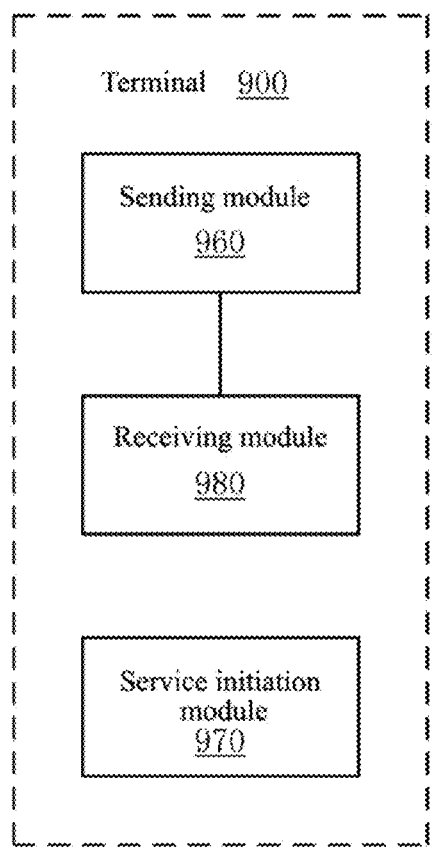
FIG. 10 is a schematic diagram of the composition of a terminal in embodiment III of the present invention.

As shown in FIG. 10, the terminal 900 in the present embodiment mainly includes a sending module 960, a service initiation module 970 and a receiving module 980, wherein the sending module 960 is configured to send uplink (UL) data feature information corresponding to a service supported by the terminal to a network element in the access network;

the service initiation module 970 is configured to initiate a service;

the receiving module 980 is connected to the sending module 960, and the receiving module 980 is configured to receive the UL resource scheduling signaling sent by the network element in the access network;

wherein the network element in the access network is used for sending the UL resource scheduling signaling according to the UL data feature information corresponding to the service initiated by the service initiation module 970.

In this embodiment, the sending module 960 is configured to: send the UL data feature information corresponding to the service supported by the terminal to the network element in the access network during a random access process of the terminal, an RRC layer connection establishment process with the network element in the access network, an RRC layer connection reconfiguration process with the network element in the access network or an RRC layer connection reestablishment process with the network element in the access network.

Those skilled in the art should understand that the above modules or steps of the present invention can be implemented using a general-purpose computing device, and they can be integrated on a single computing device or distributed over a network composed of multiple computing devices; optionally, they can be implemented using computing device executable program codes, thus, they can be stored in a storage device for being executed by the computing device, or they can be made into various integrated circuit modules respectively, or some modules or steps therein are made into a single integrated circuit module for implementation. In this way, the present invention is not limited to any particular combination of hardware and software.

What is described above is merely preferred embodiments of the present invention, and not to intended to limit the scope of protection of the present invention. According to the invention content of the present invention, there may be many other embodiments, and those skilled in the art can make various corresponding changes and variations without departing from the spirit and essence of the present invention, and any modifications, equivalents, improvements, etc. made within spirit and principle of the present invention shall fall into the scope of protection of the present invention.

INDUSTRIAL APPLICABILITY

As compared to the related art, in the resource scheduling technology proposed in the technical solution of the present invention, as to services with the UL data amount thereof being regular or predictable, by way of changing the existing scheduling flow, the UL resource scheduling can save more control signaling and reduce scheduling delay, improving the radio spectrum efficiency and system throughput and enhancing user experience.

I claim:

1. A radio resource scheduling method, comprising:
a network element in an access network acquiring uplink (UL) data feature information corresponding to a service supported by a terminal;
when the terminal determines that an initiated service is regular or predictable, the terminal waiting for a UL resource scheduling signaling of the network element in the access network without sending a UL data amount size information report to the network element in the access network; and
when the service initiated by the terminal is regular or predictable, the network element in the access network sending the UL resource scheduling signaling to the terminal according to the previously acquired UL data feature information corresponding to the service initiated by the terminal;
when the network element in the access network fails to receive a UL data reported by the terminal at a UL scheduling position indicated by the UL resource scheduling signaling, the network element in the access network stopping scheduling and waiting for the terminal to report a scheduling request and a UL data amount size information report.

2. The method according to claim 1, wherein the UL data feature information corresponding to the service supported by the terminal comprises a data model feature of the service supported by the terminal or packet size information about the service supported by the terminal.

3. The method as according to claim 2, wherein
the data model feature comprises one or more of the following pieces of information:
whether packet size range is fixed, quantity of kinds of packets with fixed packet size range, whether a packet is sent for a single time, whether the packet is sent periodically, a period for sending a kind of packet which is sent periodically, whether a sending order of many kinds of packets with fixed size range is consistent with a fixation rule and the fixation rule with which this sending order is consistent.

4. The method as according to claim 2, wherein
the packet size information about the service supported by the terminal comprises one or more of the following pieces of information:
an actual value or actual value range of the packet size, a level of the packet size range and a packet size type divided according to the packet size range.

5. The method according to claim 1, wherein the step of the network element in the access network acquiring uplink (UL) data feature information corresponding to the service supported by the terminal comprises:
the network element in the access network acquiring the UL data feature information corresponding to the service supported by the terminal from a network element in a core network, a machine type communication (MTC) server or the terminal.

6. The method according to claim 5, wherein the step of the network element in the access network acquiring the UL data feature information corresponding to the service supported by the terminal from the terminal comprises: the terminal reporting the UL data feature information during a process when the terminal establishes a connection with network side.

7. The method according to claim 6, wherein the process of the terminal establishing a connection with the network side comprises:
a random access process of the terminal, a radio resource control (RRC) layer connection establishment process with the network element in the access network, a RRC layer connection reconfiguration process with the network element in the access network or a RRC layer connection reestablishment process with the network element in the access network.

8. The method according to claim 7, wherein the step of the terminal reporting the UL data feature information during the process when establishing a connection with the network side comprises:
the terminal reporting the UL data feature information corresponding to the service supported by the terminal in a message 3 during the random access process, or
the terminal reporting the UL data feature information corresponding to the service supported by the terminal in a connection request message or a connection establishment completed message during the RRC layer connection establishment process, or
the terminal reporting the UL data feature information corresponding to the service supported by the terminal in a connection reconfiguration completed message during the RRC layer connection reconfiguration process, or
the terminal reporting the UL data feature information corresponding to the service supported by the terminal in a connection reestablishment request message or a connection reestablishment completed message during the RRC layer connection reestablishment process.

9. The method as according to claim 1, wherein,
when the network element in the access network acquires the UL data feature information corresponding to the service supported by the terminal from the network element in the core network, the UL data feature information corresponding to the service supported by the terminal is stored in the network element in the core network, and register information corresponding to the terminal comprises the UL data feature information corresponding to the service supported by the terminal;
when the network element in the access network acquires the UL data feature information corresponding to the service supported by the terminal from the MTC server, the MTC service stores the UL data feature information corresponding to the service supported by the terminal.

10. The method according to claim 1, wherein the UL data feature information corresponding to the service supported by the terminal is transmitted to the network element in the access network via an S1 interface signaling flow by the network element in the core network or forwarded to the network element in the access network via the network element in the core network by the MTC server.

11. The method according to claim 10, wherein the S1 interface signaling flow comprises an S1 interface signaling in a terminal context initialization flow, an S1 interface signaling in a terminal context change flow, or a newly added S1 interface signaling.

12. The method according to claim 1, further comprising:
the terminal sending a scheduling request to the network element in the access network, and
the network element in the access network sending the UL resource scheduling signaling to the terminal according to the UL data feature information corresponding to the service initiated by the terminal after receiving the scheduling request.

13. A network element in an access network, comprising an acquisition module and a sending module, wherein
  the acquisition module is configured to acquire uplink (UL) data feature information corresponding to a service supported by a terminal;
  the sending module is configured to, when the service initiated by the terminal is regular or predictable, send a UL resource scheduling signaling to the terminal according to the previously acquired UL data feature information corresponding to the service initiated by the terminal without requiring the terminal sending a UL data amount size information report to the network element in the access network; and
  the acquisition module is further configured to, when failing to receive a UL data reported by the terminal at a UL scheduling position indicated by the UL resource scheduling signaling, stop scheduling and wait for the terminal to report a scheduling request and a UL data amount size information report.

14. The network element in the access network according to claim 13, wherein
  the acquisition module is configured to acquire the UL data feature information corresponding to the service supported by the terminal by the following way: acquire the UL data feature information corresponding to the service supported by the terminal from the network element in the core network, a machine type communication (MTC) server or the terminal.

15. The network element in the access network according to claim 14, wherein
  the acquisition module is configured to acquire the UL data feature information corresponding to the service supported by the terminal by the following way: acquire the UL data feature information corresponding to the service supported by the terminal during a random access process of the terminal, a RRC layer connection establishment process of the network element in the access network with the terminal, a RRC layer connection reconfiguration process of the network element in the access network or a RRC layer connection reestablishment process of the network element in the access network.

16. A terminal, comprising a sending module, a service initiation module and a receiving module, wherein
  the sending module is configured to send uplink (UL) data feature information corresponding to a service supported by the terminal to a network element in an access network;
  the service initiation module is configured to initiate the service, and
  the receiving module is configured to, when determining that the initiated service is regular or predictable, receive a UL resource scheduling signaling sent from the network element in the access network without sending a UL data amount size information report to the network element in the access network;
  wherein the network element in the access network is used for, when the service initiated by the terminal is regular or predictable, sending the UL resource scheduling signaling to the terminal according to the previously acquired UL data feature information corresponding to the initiated service; and
  the sending module is further configured to not send a UL data at a UL scheduling position indicated by the UL resource scheduling signaling, so that the network element in the access network stops scheduling and waits for the terminal to report a scheduling request and a UL data amount size information report.

17. The terminal according to claim 16, wherein
  the sending module is configured to send the UL data feature information corresponding to the service supported by the terminal to the network element in the access network in the following way: send the UL data feature information corresponding to the service supported by the terminal to the network element in the access network during a random access process of the terminal, an RRC layer connection establishment process with the network element in the access network, an RRC layer connection reconfiguration process with the network element in the access network or an RRC layer connection reestablishment process with the network element in the access network.

* * * * *